US007300514B2

(12) United States Patent
Bonafous et al.

(10) Patent No.: US 7,300,514 B2
(45) Date of Patent: Nov. 27, 2007

(54) PHOTOCATALYTIC GRANULAR MIXTURE FOR MORTAR AND CONCRETE AND ITS USE

(75) Inventors: Laurent Bonafous, Versailles (FR);
Luigi Cassar, S. Donato Milanese (IT);
Pierre Cassat, Le Mesnil Simon (FR);
Pierre Colombet, deceased, late of Nantes (FR); by Francine Colombet, legal representative, Nantes (FR);
Laurent Guillot, Seyssinet-Pariset (FR)

(73) Assignee: Ciments Francais, Puteaux (FR)

( * ) Notice: Subject to any disclaimer, the term of this patent is extended or adjusted under 35 U.S.C. 154(b) by 419 days.

(21) Appl. No.: 10/677,682

(22) Filed: Oct. 3, 2003

(65) Prior Publication Data
US 2004/0101683 A1 May 27, 2004

(30) Foreign Application Priority Data
Oct. 3, 2002 (FR) .................................. 02 12221

(51) Int. Cl.
*C04B 22/06* (2006.01)
(52) U.S. Cl. ...................................... 106/712; 106/733
(58) Field of Classification Search ................ 106/712, 106/733
See application file for complete search history.

(56) References Cited

U.S. PATENT DOCUMENTS

| 3,843,380 | A | * | 10/1974 | Beyn |
| 4,946,505 | A | * | 8/1990 | Jungk .......................... 106/712 |
| 6,117,229 | A | * | 9/2000 | Cassar et al. ................ 106/724 |
| 6,406,536 | B1 | * | 6/2002 | Cassar et al. ................ 106/723 |
| 6,409,821 | B1 | * | 6/2002 | Cassar et al. ................ 106/733 |
| 6,824,826 | B1 | * | 11/2004 | Amadelli et al. ........... 427/258 |
| 6,881,701 | B2 | * | 4/2005 | Jacobs ......................... 502/300 |
| 2004/0024108 | A1 | * | 2/2004 | Sugihara |

FOREIGN PATENT DOCUMENTS

| EP | 0 684 075 | 11/1995 |
| EP | 0 885 857 | 12/1998 |
| EP | 0 919 667 | 6/1999 |
| EP | 1 162 182 | 12/2001 |
| JP | 09066238 | * 3/1997 |
| JP | 09075747 | * 3/1997 |
| JP | 10043549 | * 2/1998 |

(Continued)

OTHER PUBLICATIONS

"Approach toward decomposition of environmental contaminants by using cement porous materials",☐☐Tanaka, Semento, Konkurito Ronbunshu (1996), 50, 956-961.*

(Continued)

*Primary Examiner*—Paul Marcantoni
(74) *Attorney, Agent, or Firm*—Young & Thompson

(57) ABSTRACT

The photocatalytic granular mixture for mortar and concrete includes a photocatalyst in the form of at least two granular classes with different B.E.T. specific surfaces. It has a photocatalytic activity greater than that of a monodisperse photocatalyst with a single range of B.E.T. specific surface, and thus permits, in association with a conventional hydraulic binder, to obtain construction and repair materials whose aptitude for self cleaning, for the reduction of odors, and for the depollution of ambient air, is considerably improved.

17 Claims, 5 Drawing Sheets

FOREIGN PATENT DOCUMENTS

| | | | |
|---|---|---|---|
| JP | 10180095 | * | 7/1998 |
| JP | 10180116 | * | 7/1998 |
| JP | 10272355 | * | 10/1998 |
| JP | 11228204 | * | 8/1999 |
| JP | 11263660 | * | 9/1999 |
| JP | 11264224 | * | 9/1999 |
| JP | 2000017202 | * | 1/2000 |
| JP | 2000017784 | * | 1/2000 |
| JP | 2000117117 | * | 4/2000 |
| JP | 2002154861 | * | 5/2002 |
| JP | 2002155612 | * | 5/2002 |
| JP | 2002167524 | * | 6/2002 |
| JP | 2002191984 | * | 7/2002 |
| JP | 2002239398 | * | 8/2002 |
| JP | 2003112960 | * | 4/2003 |
| JP | 2003192427 | * | 7/2003 |
| KR | 2001087807 | * | 9/2001 |
| KR | 2002058946 | * | 7/2002 |
| WO | WO 98 05601 | | 2/1998 |

OTHER PUBLICATIONS

Masakazu et al, "Design of Unique Titanium Oxide Photocatalysts by an Advanced Metal Ion-Implantation Method and Photocatalytic Reactions Under Visible Light Irradiation", Res. Chem Intermed. vol. 24, No. 2. pp. 143-149(1998).

Takeuchi et al., "Photocatalytic Decomposition of No Under Visible Light Irradiation on the CR-Ion-Implanted T102 Thin Film Photocatalyst", Reference No. 867, Catalysis Letters 67 (2-4): 135-137, 2000.

* cited by examiner

Fig. 2  Rhodamine B

Example 1
Example 2
Example 3
Example 4

PHOTOCATALYTIC GRANULAR MIXTURE FOR MORTAR AND CONCRETE AND ITS USE

The present invention relates to a photocatalytic granular mixture for concrete or mortar, concretes or mortars including such a mixture and their use in the fields of construction or renovation of buildings, or roadway coatings.

The use of photocatalysts such as $TiO_2$, for example in its anatase crystallographic variety and in the form of powder, for the production of devices permitting the elimination of sources of soiling or odoriferous substances, harmful to the health, is a well-known process. $TiO_2$ powder is deposited on the surface of the device so as to ensure the largest interface possible with the external environment, the retention of the powder on the substrate being ensured by a glue or a binder. This binder can be a hydraulic inorganic binder such as Portland cement as described in patent applications WO 98/05601 and EPO 885 857.

The photocatalytic layer which appears at the surface and which adheres to the substrate by means of the binder can if desired be reinforced by filling the interstices between the particles of photocatalyst with smaller grains, permitting by sintering in the solid state, better binding the grains of photocatalyst together. The small grains, of metallic silver or platinum, or tin oxide $SnO_2$ for example, thereby permit increasing the mechanical strength of the photocatalytic layer. Such a material is described in patent application EPO 684 075 (TOTO Ltd.). The particles of photocatalyst have in general a diameter of the order of 0.1 μm and are monodisperse, the small particles of Ag, Pt or $SnO_2$ filling the interstices have in general a diameter of the order of 0.01 μm. The preparation of such a material has the major drawback of comprising a sintering step which it is not possible to carry out without no matter what the support, in particular such a step is impossible on the outside, on constructions, walls, floors of large surface, etc.

Moreover, the hydraulic binders are very often adapted for the construction of buildings, artworks, structural elements and roadway surfacings. Their cost of production must necessarily be low, given the volumes of material involved. However, the cost of photocatalysts such as $TiO_2$ is generally 10 to 100 times higher. As a result, if it is desired to maintain an acceptable market price for hydraulic binders containing photocatalytic particles, it is necessary to limit the proportion of such particles, which results in limited photocatalytic effectiveness of the hydraulic binder. It is thus of primary importance to increase the photocatalytic efficiency itself of the photocatalyst (without excessive cost) so as to be able to decrease its proportion.

Moreover, the proportion of photocatalytic particles should not exceed a certain value (30-40% of the total volume of binder+photocatalyst) beyond which the binder cannot play its role: the photocatalyst, with generally speaking finer grains (0.1 μm) than the grains of cement (10 μm)., will thus detach from the material. The photocatalytic efficiency of the hydraulic binders containing particles of photocatalyst can therefore not be improved by increasing the proportion of photocatalysts beyond this limit. From this arises the need to increase the photocatalytic activity; holding the proportion of photocatalyst constant.

One of the solutions proposed is to increase the efficiency of photocatalysts by doping or creation of lacunae with oxygen (see the articles of MASAKAZU ANPO et al. in Res. Chem. Intermed 1998, Vol. 24, No. 2, p. 143-149 and of MASATO TAKEUCHI et al. in Catalysis letters 2000, 67(2-4), p. 135-137). However, these products impart a very great cost increase, incompatible with use on a large scale in compositions for mortars and concretes, for example.

It has now been discovered in a surprising manner that by mixing particles of photocatalysts of different granulometries (or granular classes), having different specific surfaces, in a composition for concrete or mortar, with a hydraulic binder, without sintering, it is possible to obtain a photocatalytic effect substantially improved relative to the photocatalysts of this starting granular class.

This permits preparing concretes or mortars having an important photocatalytic function and hence a self-cleaning character, by degrading the molecules retained at their surface, or adjacent their surface.

As a result, the present invention relates to a photocatalytic granular mixture for mortar or concrete constituted by particles of n granular classes, having different specific surfaces, n being a number greater than or equal to 2.

Thus, surprisingly, it has been discovered that a composition based on hydraulic binder, for example a concrete or a mortar including such a granular mixture, has an important synergetic effect, namely an increase of the photocatalytic activity even beyond the photocatalytic activity of each composition based on hydraulic binder including but a single granular class, with a single range of B.E.T. specific surface.

Preferably, the catalytic effect is particularly improved when the mixture is constituted by two different granular classes, having B.E.T. specific surfaces $S_1$ and $S_2$, satisfying the relationship $S_1/S_2 \geq 1.7$, $S_1$ being the mean specific surface of the class with greater specific surface and $S_2$ being the mean specific surface of the class of smaller specific surface, preferably when $S_1/S_2 \geq 2$, and more preferably when $S_1/S_2 \geq 0.5$.

This specific effect is particularly observed when the size of the catalyst particles is comprised between about 0.010 and 0.500 μm and more particularly when only one of the granular classes is about or less than 0.100 μm.

Said photocatalytic granular mixture can be present in the form of a powder.

In this particular application to concretes or mortars, it has also been observed that a photocatalytic granular mixture present in the form of an aqueous solution showed a photocatalytic activity greater than that of the powder.

The aqueous suspension preferably contains a dispersing agent, preferably compatible with the cement, concrete and mortar media and selected for example from sodium pyrophosphate, dimethylamino-2 propanol, citric acid, polyacrylates, polyoxygenated nonylphenol, copolymers of sodium methacrylates/tertiary amines, . . . , this list not being limiting.

When the aqueous solution includes dimethylamino-2 propanol as the dispersing agent, a total content of particles greater than about 30% by weight is possible, this content being preferably comprised between about 40 and 60% by weight.

The suspension can also include a thickening agent as a known additive to improve the stability of the suspension. It must of course be compatible with the medium in which the dispersion will be introduced, namely in this case concretes or mortars. This thickening agent can be selected for example from xanthan gum, gum arabic, cellulose ethers.

In the case of a mixture according to the invention with two granular classes, the photocatalytic synergetic effects have been particularly observed when the mixture includes from 10 to 90% by dry weight of the first granular class and from 90 to 10% by dry weight of the second granular class, and more particularly when it includes 20 to 80% by dry weight of the first granular class, and 80 to 20% by dry weight of the second granular class.

Moreover, the synergetic effect has been noted in particular when the photocatalyst is a titanium oxide, principally in the anatase crystallographic form.

It is to be noted that the processes of synthesizing anatase $TiO_2$ at present used lead to the obtention of powders which are substantially mono-dispersed whose particle sizes are dictated by the nature of the process.

It is thus impossible, except by mixing, to produce a $TiO_2$ powder with a wider granular distribution (which is to say bimodal or multimodal), and particularly with ratios of mean sizes of particles greater than or equal to 2 or 5.

The B.E.T. specific surface of these specimens of photocatalysts tested, increases when the size of the particles decreases: the particles thus have in effect a greater total available surface, which is thus active.

As a result, the mixture of photocatalysts having particles of different granular classes, thus corresponds to a mixture of particles of different specific surfaces. The smallest particles have a B.E.T. specific surface $S_1$ that is greater, and conversely the largest particles have a B.E.T. specific surface $S_2$ that is less ($S_1 > S_2$) preferably, the ratio $S_1/S_2$ is greater than or equal to about 1.7, and preferably greater than or equal to about 2, even greater than or equal to 5.

The photocatalytic granular mixture is particularly appropriate for the compositions of concrete or mortar comprising, for about 70 to 99.5 parts by weight of a hydraulic binder, about 0.5 to 30 parts by weight, on a dry weight basis, of a photocatalytic granular mixture according to one of claims 1 to 12, and preferably 90 to 99 parts by weight of hydraulic binder to 1 to 10 parts by weight of said mixture.

The hydraulic binder is preferably a cement comprised of a clinker and a setting regulator (gypsum for example), and including other additives if necessary, preferably the hydraulic binder is Portland cement, or natural or artificial hydraulic lime, or a mixture of these latter.

The present invention also relates to any concrete or mortar prepared from the above-mentioned compositions or from separate components to which the photocatalytic granular mixture is added at the time of mixing (for example when said mixture is in the form of an aqueous suspension which can be added only at this point).

Such mortars or concretes have the property, thanks to the photocatalyst, of being capable of degrading in the presence of light (U.V. and/or visible) the polluting substances in contact with its surface: it can be a matter of compounds present in the environment such as $NO_x$, $SO_x$, PM10 or automobile or industrial exhaust gases, volatile organic compounds (V.O.C.) such as aromatic compounds, pesticides, or else molds, bacteria.

The material is also "self-cleaning", because it keeps a clean appearance over time by degrading to the extent the substances that deposit on its surface.

So as to quantify this "self-cleanability" characteristic, the inventors have tried various processes permitting "quantifying" the photocatalytic activity of the granular mixture according to the invention, relative to that of a catalyst of a single granulometric class (or a single specific surface).

These processes use the measurement:
either of the amount of degradation, a colored molecule applied to the surface of a plate including said mixture;
or of the quantity of destruction of a pollutant retained on the surface or adjacent thereto, of a material including said mixture;

after exposure to UV and/or visible radiation for a given time, fixed at a value comprised generally between 5 and 30 hours. (This time can however be greater for measurements carried out for example outside, after exposure to natural light or to direct solar radiation.)
or of the time necessary for a surface to resume a given reflectivity after application of a colored molecule.

Very interesting and surprising results have been noted particularly in concretes or mortars including the photocatalytic granular mixture of the invention, which have:
a quantity of degradation, after exposure to UV and/or visible radiation for a given time, of an organic coloring agent applied to their surface, greater than or equal to 120, with reference to a quantity of degradation of 100 obtained with an identical composition including the same weight of the same photocatalyst of a single granular class of greater B.E.T. specific surface $S_1$, and/or
a quantity of destruction of a pollutant retained on their surface, greater than 80%, after exposure to UV and/or visible radiation for a given time, and/or
a duration necessary for the surface to recover a reflectivity equal to at least 90% of the initial reflectivity, less than 8 hours, after application of an organic coloring material and then exposure to UV and/or visible radiation.

The organic coloring material mentioned above can be selected from rhodamine B, methylene blue, phenanthroquinone and bromocresol green.

The above-mentioned concretes or mortars, as well as the basic cement binder compositions including the photocatalytic granular mixture according to the invention, which find interesting application in the form of coatings with a layer thickness ranging from about a millimeter to about a centimeter or in mineral paints, can be used in the field of civil engineering and for the construction or renovation of buildings, or else in the field of roadway coatings.

The present invention will be better understood from the examples which follow, with reference to the accompanying drawings, in which.

Figure 4:
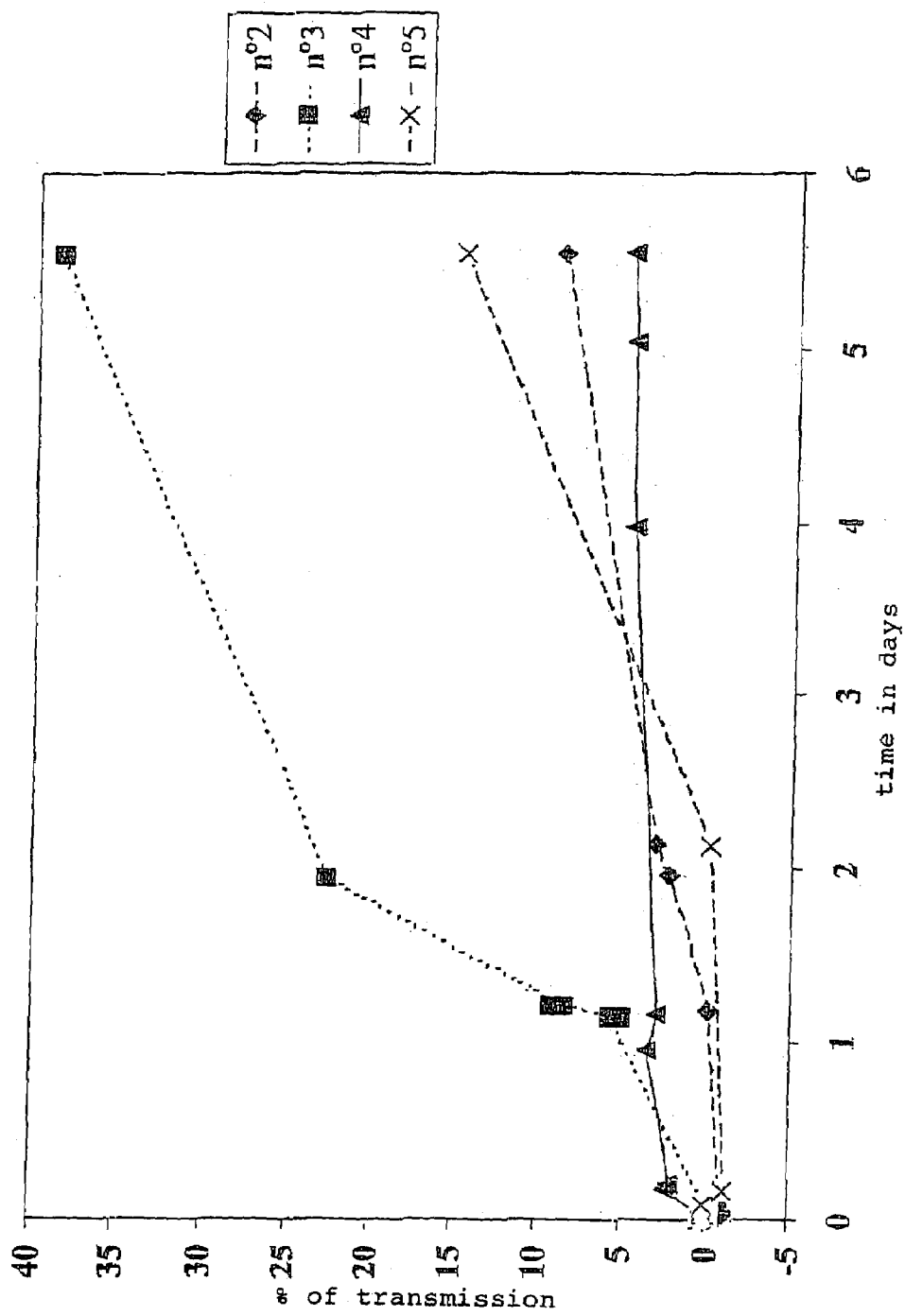
Figure 5:
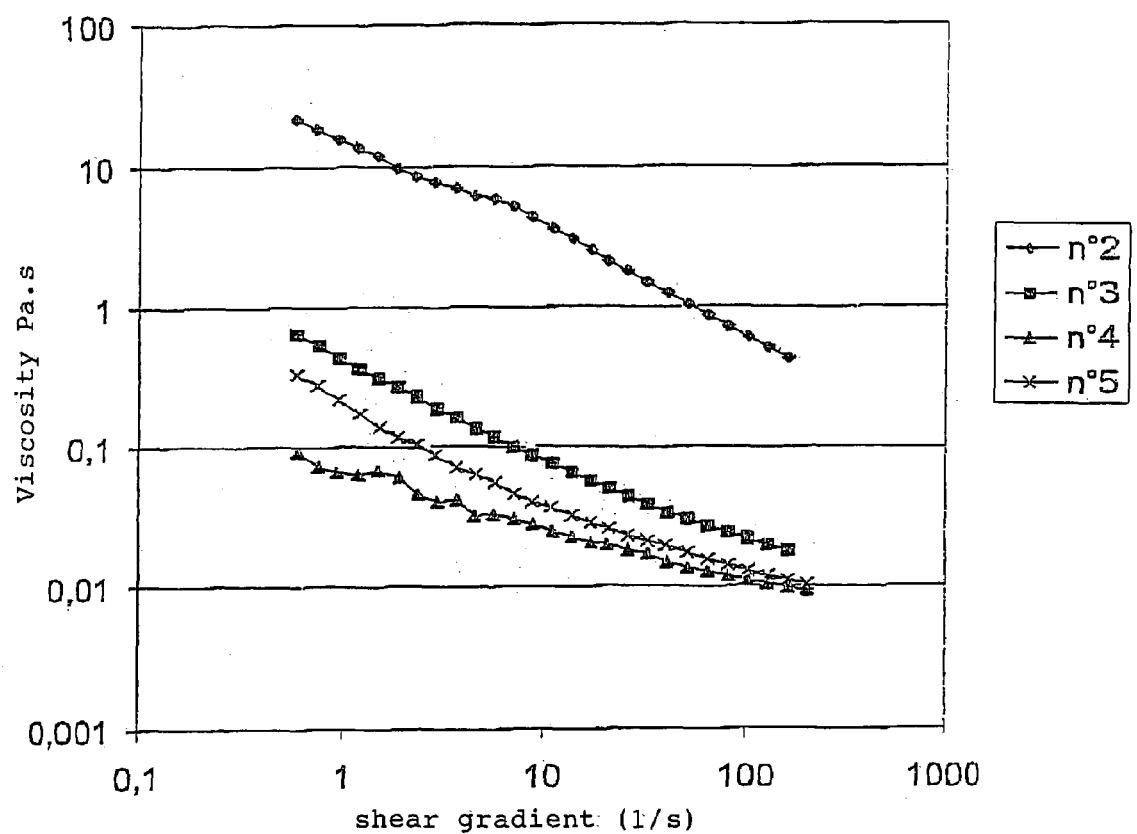

FIGS. 4 and 5 compare the stability of aqueous solutions of $TiO_2$.

EXAMPLES 1 TO 4

Examples 1 to 4 have been carried out under identical conditions:
a—Characteristics of the First Materials Used
Square plates of 15 cm on a side and 2 cm thickness of mortar have been prepared according to the standard NF EN 196-3 from the following primary materials:
100 parts by weight of cement: CEM I 52.5N CE CP2 NF "SB" from the Cruas factory (Ciments Calcia Company—France) having the following characteristics:
Blaine specific surface=4050 $cm^2g$
mean diameter=12.0 μm
rejected by 40 μm=5.0%

1, 2 or 5 parts by weight of TiO$_2$ in the form of dry powder:
AHR of the Tioxide Company
AT1 of the Millennium Company
PC105 of the Millennium Company
Their physical characteristics are shown in Table 1.

TABLE 1

Characteristics of the different titanium oxides used

|  | Particle size (crystallites) (nm) | B.E.T. Mean specific surface (m$^2 \cdot$ g$^{-1}$) |
|---|---|---|
| AHR | 150 | S$_2$ = 11 |
| AT1 | 150 | S$_2$ = 10 |
| PC105 | 15-25 | S = 85 |

300 parts by weight of sand: CEN sand
50 parts by weight of water (water/cement ratio=0.5)

b—Procedure for Determining the Photocatalytic Activity

The "self-cleanability" test consists in following the calorimetric development under artificial light as a function of time, specimens of mortar in the form of plates prepared according to the point a above, of which one surface is initially tinted by application of rhodamin B C$_{28}$H$_{31}$ClN$_2$O$_3$) or of bromocresol green (C$_{21}$H$_{14}$Br$_4$O$_5$S)$_2$ The precise quantity of coloring agent deposited is 3 μg.cm$^{-2}$ for rhodamin B and 2.5 μg.cm$^{-2}$ for bromocresol green.

The tinted surface of the specimens is exposed for 30 hours to artificial light whose radiation is similar to that of natural sunlight. The lamp used is an OSRAM Ultravitalux® 300 W lamp placed such that the radiation on the surface of the specimen will be 10 W.m$^{-2}$. The calorimetric measurements are carried out with the help of a tristimulus calorimeter (Minolta CR 231). The results obtained are expressed according to the CIE LAB (L*, a*, b*) system. The L* factor corresponds to luminosity. The factors a* and b*, chromatic components, correspond respectively to the color axes according to:

White (L*=100)–Black (L*=0)
Green (a* negative)–Red (a* positive)
Blue (b* negative)–Yellow (b* positive)

The photocatalytic efficiency of the binder is judged according to the capacity of the initially tinted surface to recover more or less rapidly its original color, because of the destruction of the coloring molecule. In the case of rhodamin B, of red color, as well as for Bromocresol green, the most significant development is that of the factor a*.

The speed of destruction of the colorant, Va* (absolute value in arbitrary units), is thus expressed according to the following relationship:

$$Va^* = \left| \int_{t=0}^{t=5h} \frac{\partial a^*(t)}{\partial t} \cdot dt \right| \times \frac{100}{V_{a^* reference}}$$

which can be computed considering that $$a^*(t) = A \times e^{-B \times t} + \frac{C}{(t+D)} + a^*_{pp}$$

A, B, C and D being the parameters determined by adjustment of the computed and experimental curves. $a^*_{pp}$ is the value of a* for the mortar before application of the coloring agent.

$$V_{a^* reference} = \left| \int_{t=0}^{t=5h} \frac{\partial a^*_{PC105}(t)}{\partial t} \cdot dt \right|$$

is the reference speed. Its value is fixed at 100.

It corresponds to the reference mortar produced from binder for which the photocatalyst is only of the smallest granulometry (which is to say the highest B.E.T. specific surface), here titanium dioxide PC105.

c—Colorimetric Development of the Tinted Surface

Figure 1:
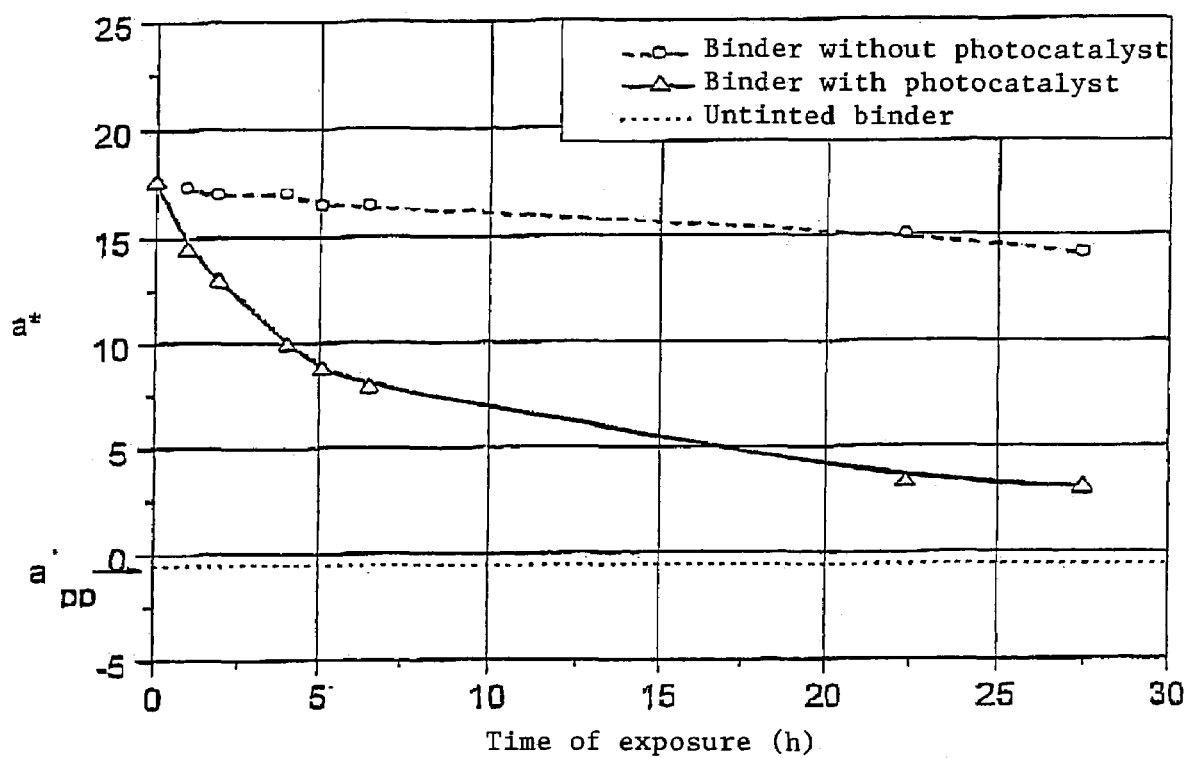
FIG. 1 shows the calorimetric development of the colored surface and of a material produced from a composition according to the invention.

The development of the factor a* has been noted for the surface of the mortar plate initially tinted by the colorant, as a function of the time of exposure to the light according to procedure b. These results are given in FIG. 1 (for the case of rhodamin B).

Figure 2:
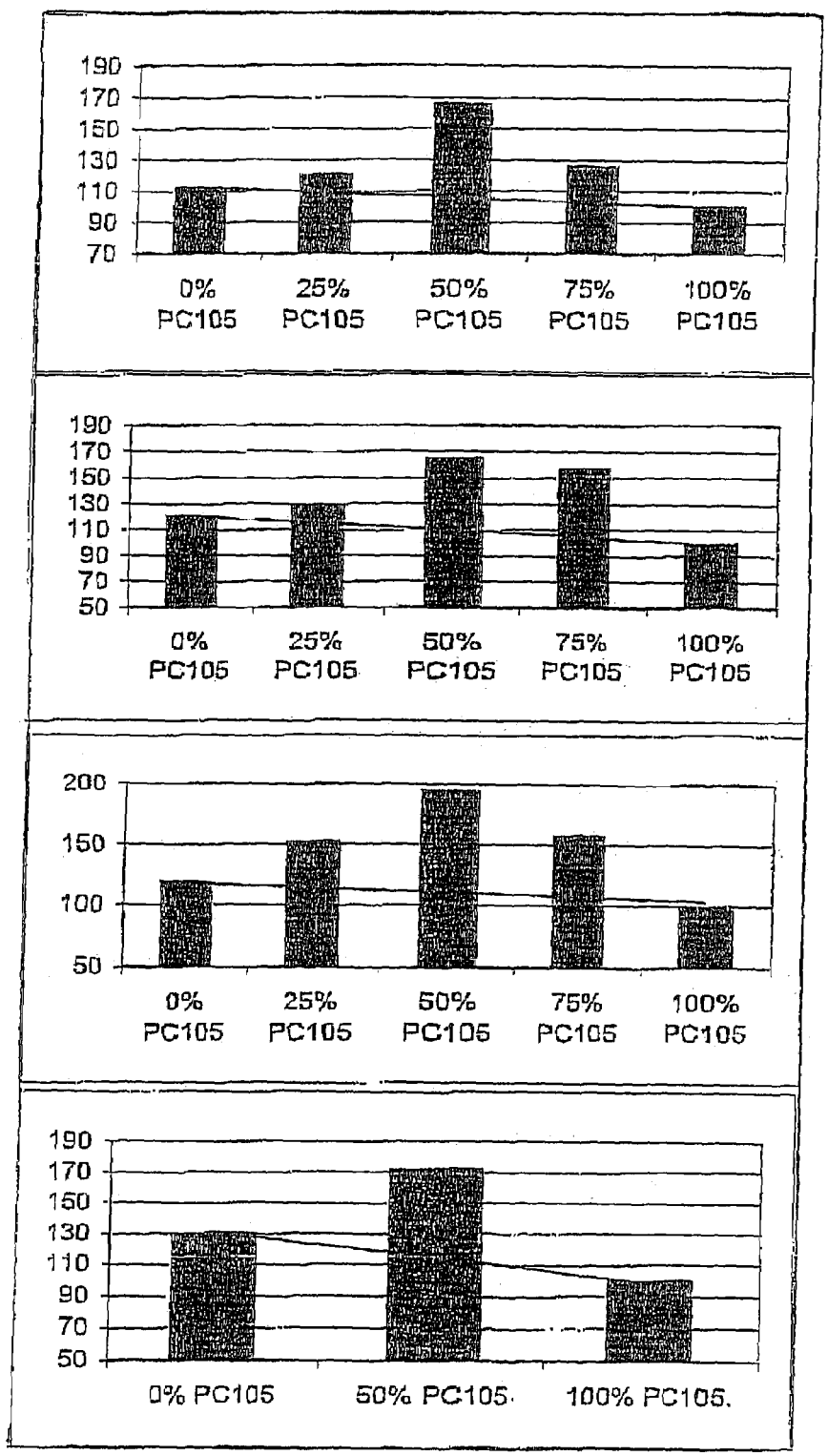
FIG. 2 shows the amount of degradation of rhodamine B obtained with different percentages of mixtures of $TiO_2$ in compositions according to the invention.
Figure 3:
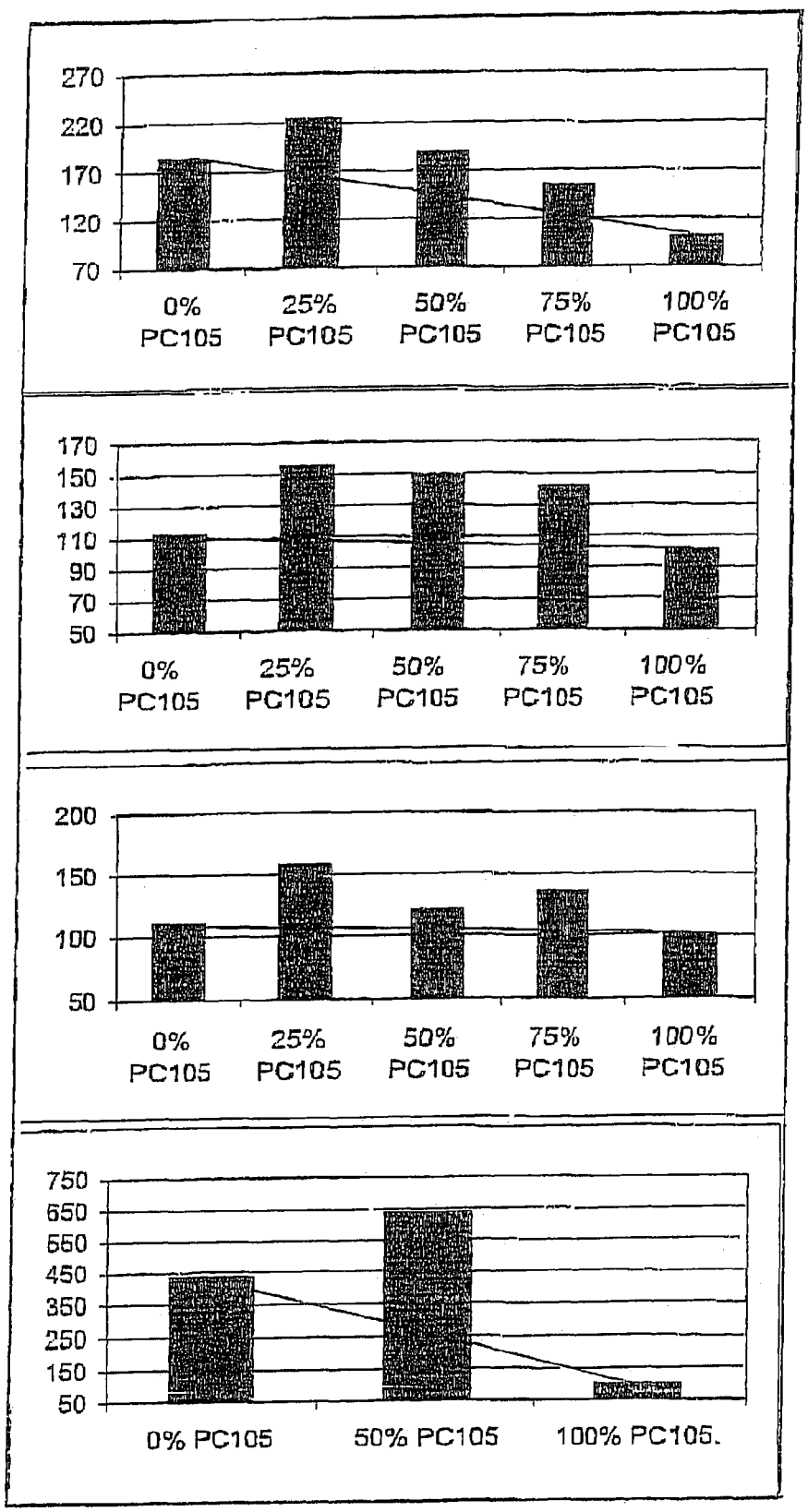
FIG. 3 shows the amount of degradation of bromocresol green obtained with different percentages of $TiO_2$ in the compositions according to the invention.

Different total contents of photocatalyst have been tested: they are the objects of Examples 1 to 4 hereafter, shown in FIG. 2 (Rhodamin B) and in FIG. 3 (bromocresol green).

In each case, titanium dioxide PC105 (the smallest granulometry, and the highest specific surface S$_1$) serves as a reference (Va*=100).

The time of exposure was 30 hours, but there was little change between 5 hours and 30 hours.

Example 1

Total content of TiO$_2$=1%

TABLE 2

| V$_a$*(u.a.) | 100% AHR | 75% AHR 25% PC105 | 50% AHR 50% PC105 | 25% AHR 75% PC105 | 100% PC105 |
|---|---|---|---|---|---|
| Rhodamin B | 112 | 120 | 166 | 126 | 100 |
| Bromocresol green | 184 | 224 | 189 | 154 | 100 |

Example 2

Total content of TiO$_2$=2%

TABLE 3

| V$_a$*(u.a.) | 100% AHR | 75% AHR 25% PC105 | 50% AHR 50% PC105 | 25% AHR 75% PC105 | 100% PC105 |
|---|---|---|---|---|---|
| Rhodamin B | 120 | 129 | 165 | 157 | 100 |
| Bromocresol green | 112 | 155 | 149 | 142 | 100 |

TABLE 4

| V$_a$*(u.a.) | 100% AT1 | 75% AT1 25% PC105 | 50% AT1 50% PC105 | 25% AT1 75% PC105 | 100% PC105 |
|---|---|---|---|---|---|
| Rhodamin B | 118 | 152 | 194 | 157 | 100 |
| Bromocresol green | 111 | 158 | 121 | 136 | 100 |

With this concentration of photocatalytic material, there is achieved an amount of degradation almost double by using an equal weight mixture of titanium dioxides AT1 and PC105.

Example 4

Total $TiO_2$ content=5%

TABLE 5

| $V_a$* (u.a.) | 100% AHR | 50% AHR + 50% PC105 | 100% PC105 |
|---|---|---|---|
| Rhodamin B | 130 | 172 | 100 |
| Bromocresol green | 433 | 634 | 100 |

A very high speed of degradation has been obtained with an equal weight mixture of AHR and PC105.

Example 5

Gray cement

Under the same conditions as in Examples 1 to 4 above, a plate prepared with gray cement and including 2% of a photocatalytic mixture of $TiO_2$ introduced in the form of powder was covered with an organic coloring agent.

The results were compared to a white cement (Example 2) and to a cement without photocatalyst.

TABLE 6

| $V_a$* (u.a.) | Standard 0% $TiO_2$ | Gray Cement 2% $TiO_2$ (50% AHR/ 50% PC105) | White Cement 2% $TiO_2$ (50% AHR/ 50% PC105) |
|---|---|---|---|
| Rhodamin B | 100 | 910 | 600 |
| Bromocresol green | 100 | 170 | 290 |

The cement tint is thus not an obstacle to degradation of the molecules of coloring agent: improved amounts of degradation are also observed with a gray cement.

Example 6

Coating

A coating prepared from the following constituents:

45.28 parts of white cement (by weight)

45.28 parts of lime filler 4.44 parts of metakaolin and 5.00 parts of titanium dioxide in powder form to which are added the following additives:

2 parts by weight (of dry material) of superplastifier)

0.22 parts by weight of thickener 2 parts by weight of an anti-shrinkage agent and a quantity of water according to a weight ratio of water/total solid materials comprised between 0.20 and 1 (according to the desired thickness of the coating), was applied to a concrete or mortar surface (without photocatalyst).

The amounts of degradation observed relative to a coating without photocatalyst are presented hereafter:

TABLE 7

| $V_a$* | 0% $TiO_2$ | 5% $TiO_2$ (50% AHR/ 50% PC105) |
|---|---|---|
| Rhodamin | 100 | 120 |
| Bromocresol green | 100 | 186 |

The obtained results are of the same order of magnitude as with gray cement (compare Example 5: bromocresol green).

Example 7

Other coloring agents

In this example, there have been tested phenanthroquinone ($C_{14}H_8O_2$) and methylene blue ($C_{16}H_{18}ClN_3S$) according to a procedure of application to a white mortar plate according to that of Examples 1 to 4.

The quantity of coloring agent deposited on the surface of the plate is 0.1 mg/cm$^2$. The surfaces thus tinted were illuminated by four lamps of 400 W (having an irradiation spectrum greater than 290 mm), at a temperature of 25° C. and at atmospheric pressure.

With the help of a spectro-colorimeter, there is measured the reflectance (R%) as a function of wavelength. The processing of the spectra obtained permits computing the time necessary for the specimen (the tinted surface of the plate) to recover a reflectivity equal at least to 90% of its initial reflectivity (before application of the coloring agent). The results obtained are shown in Table 9 hereafter.

The content of $TiO_2$ (powder) was 2% relative to the weight of the cement.

In addition to the photocatalysts described in Table 1, new photocatalysts have been tested, their physical parameters being the following:

TABLE 8

| | Size of particles (crystallites) (nm) | B.E.T. Mean specific surface ($m^2 \cdot g^{-1}$) |
|---|---|---|
| PC50* | 20-30 | 50 |
| PC500* | 5-10 | >250 |

*(sold by the Millennium Company)

TABLE 9

Time necessary for the specimen to recover a reflectivity greater than or equal to 90% of its initial reflectivity

| | AT$_1$ | AHR | PC105 | PC500 | Mixtures |
|---|---|---|---|---|---|
| Methylene blue | ** | ** | * | * | 50% AT$_1$ + 50% PC500 = *** 50% PC50 + 50% PC500 = *** |
| Phenanthroquinone | ** | ** | * | * | 60% AT$_1$ + 40% PC500 = **** |

TABLE 9-continued

Time necessary for the specimen to recover a reflectivity greater than or equal to 90% of its initial reflectivity

| AT₁ | AHR | PC105 | PC500 | Mixtures |
|---|---|---|---|---|
|  |  |  |  | 50% AT₁ + 50% PC500 = *** |

The classification is made according to four large categories:
* = >12 hours
** = 8 to 12 hours
*** = 4 to 8 hours
**** = ≦4 hours It will be noted that the recovery of 90% of initial reflectivity is substantially more rapid with a granular mixture than with a photocatalyst of a single granular class, at a single range of B.E.T. specific surface.

Example 8

Pollution by $NO_x$

In a closed chamber is placed a specimen in the form of a mortar plate prepared with white cement in the proportions indicated in Examples 1 to 4. The content of photocatalytic mixture of the mortar is 3% (relative to the weight of the cement).

The assembly chamber+specimen is first saturated with $NO_x$ by passage of a gaseous current including this pollutant. Then the chamber is closed. The atmosphere in the latter contains 1 ppm (volume) of $NO_x$ (value Co before irradiation). The specimen is irradiated with an OSRAM 300 W lamp for a given time (here 3 minutes). The final concentration Cf of $NO_x$ is then determined within the chamber.

The results obtained are the following:

Quantity of destruction of $NO_x$ (%)=(Co−Cf)/Co×100= with AHR alone: <75% with PC500 alone: between 80 and 85% with a mixture of 30% AHR and 70% PCT500: >85%

This example also shows a synergetic effect of the photocatalyst in the form of a granular mixture.

Example 9

Preparation of a concentrated suspension of $TiO_2$

In a beaker, to 100 parts by weight of water, there are added successively x parts of $TiO_2$ AH-R y parts of $TiO_2$ PC 105 (x+y=100, which corresponds to 50% of solid material) then the quantity of dispersant necessary to obtain a homogeneous mixture. Homogeneity is achieved after 15 minutes of agitation of the suspension with a magnetized bar, at ambient temperature (20° C.). The dispersant selected after numerous tests is DMA-2P (dimethylamino 2 propanol). It is the only one which permits obtaining very concentrated suspensions (>30%) without using an intensive malaxating procedure nor grinding. After a rest period of not more than 1 minute, there are carried out two withdrawals, one for measurement of turbidity, the other for measurement of viscosity.

The composition of the different aqueous suspensions thus prepared is indicated in Table 10 hereafter.

TABLE 10 percentage of DMA-2P is expressed relative to the total weight of water + $TiO_2$.

| Number of suspension | x(AH-R) | y(PC 105) | DMA-2P % |
|---|---|---|---|
| 0 | 0 | 100 | 3 |
| 1 | 20 | 80 | 1.5 |
| 2 | 40 | 60 | 0.5 |
| 3 | 60 | 40 | 0.5 |
| 4 | 80 | 20 | 0.5 |
| 5 | 100 | 0 | 0.5 |

Thus, only suspensions Nos. 2, 3, 4 and 5 have been characterized by turbimetry and viscosimetry. The two other suspensions (Nos. 0 and 1) appear to be impossible to disperse correctly, even by increasing the quantity of dispersant relative to that used for suspensions Nos. 2, 3, 4 and 5, as indicated in Table 9. Once agitation is terminated, sedimentation takes place in a visible manner (which translates into the difficulty of deflocculating the $TiO_2$ powder).

a) Turbidimetry

Measurement begins immediately after the rest period mentioned above. The analyzer used is a Turbiscan MA100 of the FORMULACTION company. The measurement principle depends on the diffusion of light through the suspended particles. The light source emits in the near infrared (850 nm). The optical detection system, secured to the emitter, carries out a complete sweeping of the height of the tube into which has been first poured the suspension to be characterized. There is detected both the flux transmitted and the flux retrodiffused, each 40 μm over a maximum height of 80 mm. Transmitted flux and retrodiffused flux are complementary, so that only transmitted flux is shown in FIG. 4. This figure shows the development of the percentage of transmission through the highest portion of the two (the signal is integrated over 10 mm) for the different suspensions described in Table 10, whose homogeneity has been obtained after 15 minutes of agitation.

At the beginning of measurement, the solution is homogeneous. As time passes, the particles settle out, so that the percentage of transmission decreases when the detector moves toward the lower portion of the tube. In an equivalent manner, in the upper portion of the tube, the percentage of transmission increases, the suspension becomes less translucid because of particles falling toward the bottom of the tube (FIG. 4).

FIG. 4 shows clearly that suspension No. 4 does not change in the course of time, which shows that it is stable for the duration of the experiment. The other solutions are less stable.

b) Viscosimetry

The measurements of viscosity were carried out by means of a rheometer with imposed constraint (AR 1000 of TA Instrument), which offers the possibility of controlling the shear gradient, by using the configuration of coaxial cylinders. The experimental procedure consists in subjecting the suspensions to the following sequence of operations:

pre-shearing at 0.54 $s^{-1}$ for 20 minutes, increase of the shear gradient from 0.54 to 500 $s^{-1}$, holding the gradient at 500 $s^{-1}$ for one minute, lowering the gradient from 500 to 0.54 $s^{-1}$.

The temperature was held constant at 25° C. by using a thermocontrolled bath. No significant hysteresis was observed between the rising and descent of the shear gradient. The viscosity of the suspensions as appears in FIG. 5 was calculated as being the ratio between the constraint and the shear gradient.

FIG. 5 which shows the viscosity in the static state of suspensions Nos. 2, 3, 4 and 5 (see Table 9) as a function of the shear gradient, shows clearly that suspension No. 4 is the least viscous, which is the sign of better dispersion of the $TiO_2$ particles.

c) Remarks

The qualitative observations bearing on the stability of suspensions Nos. 0 and 1 as well as the two types of characterization given above for suspensions Nos. 2, 3, 4 and 5, permits concluding, in a surprising manner, that the mixture of the two categories of $TiO_2$ corresponds to a better quality suspension than that of the two categories taken separately, with an optimum in the neighborhood of composition No. 4.

The measurements of turbidity and of viscosity have also been conducted for suspensions whose composition is given in Table 11:

TABLE 11

| the percentage of DMA-2P is equal to 0.5 in all cases | |
|---|---|
| x (AH-R) | y (PC 105) |
| 65 | 35 |
| 70 | 30 |
| 75 | 25 |
| 90 | 10 |

The compositions of Table 9 bis are in the vicinity of that of suspension No. 4. We have characterized the corresponding suspensions by turbimetry and viscosimetry to determine where is the optimum. The results show that the optimum is not clearly marked and that it is located between compositions 70/30 and 90/10, the intermediate points having identical characteristics given the approximate precision of measurement.

Example 10

Production of a Mortar with Improved Catalytic Function

The starting materials used are identical to those given in Examples 1 to 4.

To the cement and the sand are added suspensions preferred according to Example 9, with photocatalytic mixtures AHR/PC105 in the same proportions as those of Example 9 or a pulverulent mixture corresponding to the same proportions.

The additive and water are first mixed in proportions which permit obtaining mixture compositions of Table 12 below. The water thus added to the suspension $TiO_2$ is then introduced into the bowl of a conventional planetary maxalator (for example Perrier). There is then introduced the cement. The maxalation takes place first at low speed (1 turn/s) for 1 minute and 30 seconds, then, once the sand is introduced in its turn, at high speed (3 turn/s) against for 1 minute and 30 seconds. It is also possible to maxalate the cement and the sand with the water not added of the $TiO_2$ suspension, then to add this suspension at the end of maxalation.

TABLE 12

| Identification of the mortar | AHR x | PC105 y | e/c | c/s | Process |
|---|---|---|---|---|---|
| M2 | 40 | 60 | 0.5 | 1/3 | suspension |
| M3 | 60 | 40 | 0.5 | 1/3 | suspension |
| M4 | 80 | 20 | 0.5 | 1/3 | suspension |
| M5 | 100 | 0 | 0.5 | 1/3 | suspension |
| M2' | 40 | 60 | 0.5 | 1/3 | powder |
| M3' | 60 | 40 | 0.5 | 1/3 | powder |
| M4' | 80 | 20 | 0.5 | 1/3 | powder |
| M5' | 100 | 0 | 0.5 | 1/3 | powder | e/c is the weight ratio of total water/cement (total water = mixing water + water of the suspension when it is used),
c/s is the weight ratio of cement/sand,
for all the specimens, the total quantity of $TiO_2$ (dry equivalent) is equal to 5% by weight relative to the cement.

The photocatalytic activity was determined according to the procedure described in Examples 1 to 4.

The change of factor a* was noted for the tinted surface of the mortar plate initially tinted with rhodamin B, as a function of the time of exposure to light.

The duration of exposure was 30 hours. For each mortar produced according to the present invention (M2, M3, M4 and M5) the reference is the mortar produced according to the conventional process (M2', M3', M4' and M5' respectively).

The ratio i of the speeds Va*(Mi)/Va*(M'i) for each specimen (i=2, 3, 4, 5) is indicated in Table 13 which gives the ratio of speeds of destruction of rhodamin B between mortar produced according to the present invention and mortar produced according to the process with powder.

TABLE 13

| i | 2 | 3 | 4 | 5 |
|---|---|---|---|---|
| $V_a*(Mi)/V_a*(M'I)$ | 2.5 | 2.8 | 3.1 | 1.2 |

It is noted that it is advantageous to use $TiO_2$ in suspension in the water as the additive. The gain is more marked for mortar M4, which is to say the one which corresponds to the use of suspension No. 4 (see Example 9).

The invention claimed is:

1. A composition for mortar or concrete comprising:
   a hydraulic binder; and
   a photocatalytic mixture of photocatalytic titanium oxide particles of n granulometric classes having different specific surface areas, n being a number greater than or equal to 2, and of particle size comprised between about 0.010 μm and 0.500 μm, wherein,
   the hydraulic binder is about 70 to 99.5 by weight percent on a dry material basis of the composition, and the photcatalytic mixture is about 0.5 to 30 by weight percent on a dry material basis of the composition.

2. The composition according to claim 1, characterized in that the hydraulic binder is 90 to 99 by weight percent on a dry material basis of the composition, and the photcatalytic mixture is 1 to 10 parts by weight on a dry material basis of the composition.

3. The composition according to claim 1, characterized in that the hydraulic binder is Portland cement, hydraulic lime, or a mixture of these.

4. A concrete or mortar prepared from the composition according to claim 1 characterized in that the photocatalytic mixture is added to the hydraulic binder at the time of mixing in one of a form of a powder and a form of an aqueous suspension.

5. The concrete or mortar according to claim 4, characterized in that it has an amount of degradation, after exposure to UV and/or visible radiation for a given time, of an organic coloring material applied to its upper surface greater than or equal to 120, by reference to a quantity of degradation of 100 obtained with an identical composition including the same quantity by weight of the same photocatalyst of a single granulometric class of the greatest B.E.T. specific surface $S_1$.

6. The concrete or mortar according to claim 4, characterized in that it has an amount of destruction of a pollutant held on its surface, greater than 80% after exposure to UV and/or visible radiation for a given time.

7. The concrete or mortar according to claim 4, characterized in that it has a duration necessary for its surface to recover a reflectivity at least equal to 90% of the initial reflectivity in less than 8 hours, after application of an organic coloring agent and then exposure to UV and/or visible radiation.

8. The concrete or mortar according to claim 5, characterized in that the coloring agent is selected from the group consisting of rhodamin B, methylene blue, phenanthroquinone and bromocresol green.

9. The concrete or mortar according to claim 5, characterized in that the time of exposure to UV and/or visible radiation is fixed at a value comprised between 5 and 30 hours.

10. The composition according to claim 1, characterized in that the photocatalytic mixture is constituted of photocatalytic titanium oxide particles of two different granulometric classes, having B.E.T. specific surface areas $S_1$ and $S_2$, satisfying the relationship $S_1/S_2>1.7$, $S_1$ being the mean specific surface area of the particles of the class of larger specific surface area and $S_2$ being the mean specific surface area of the particles of the class of lesser specific surface area.

11. The composition according to claim 10, characterized in that the photocatalytic mixture includes 10 to 90% by dry weight of photocatalytic titanium oxide particles of the first granulometric class and 90 to 10% by dry weight of photocatalytic titanium oxide particles of the second granulometric class.

12. The composition according to claim 1, characterized in that the photocatalytic titanium oxide particles are principally in the anatase crystallographic form.

13. A composition for concrete or mortar comprising:
a hydraulic binder; and
a photocatalytic mixture of photocatalytic titanium oxide particles of two granulometric classes, wherein
10 to 90% by dry weight of the photocatalytic titanium oxide particles is a first granulometric class with a first mean B.E.T. specific surface area and a first particle size,
90 to 10% by dry weight of photocatalytic titanium oxide particles of a second granulometric class with a second mean B.E.T. specific surface area and a second particle size,
the ratio of the first granulometric class mean surface area to the second granulometric class mean surface area is greater than 1.7.

14. The composition according to claim 13, wherein one class of the two granulometric classes has a particle size about or less than 0.100 μm.

15. The composition according to claim 13, wherein the first particle size and the second particle size are between about 0.010 μm and 0.500 μm.

16. The composition according to claim 13, wherein the photocatalytic mixture is a powder form.

17. The composition according to claim 13, wherein the photocatalytic mixture is an aqueous suspension of photocatalytic titanium oxide particles.

* * * * *